United States Patent [19]

Miki et al.

[11] Patent Number: 5,135,027
[45] Date of Patent: Aug. 4, 1992

[54] THREE-WAY SOLENOID VALVE AND METHOD OF FABRICATING SAME

[75] Inventors: Nobuaki Miki, Kariya; Akira Suzuki, Chiryu; Takeshi Nasu, Anjo; Kiyohiko Sugiura, Hekinan, all of Japan

[73] Assignee: Aisin AW Co., Ltd., Japan

[21] Appl. No.: 612,999

[22] Filed: Nov. 15, 1990

[30] Foreign Application Priority Data

Nov. 15, 1989 [JP] Japan .................................. 1-294853

[51] Int. Cl.⁵ ............................................ F15B 13/044
[52] U.S. Cl. ............................ 137/596.17; 137/625.65; 251/129.02; 251/129.14; 251/129.15
[58] Field of Search .................. 137/596.17, 625.65; 251/129.02, 129.14, 129.15

[56] References Cited

U.S. PATENT DOCUMENTS

| | | | |
|---|---|---|---|
| 2,868,494 | 1/1959 | Kearns et al. | 251/129.14 X |
| 4,338,966 | 7/1982 | Smith | 137/596.17 |
| 4,509,716 | 4/1985 | Barber et al. | 251/129.15 X |
| 4,578,662 | 3/1986 | Slavin et al. | 137/626.65 |
| 4,783,049 | 11/1988 | Northman et al. | 137/625.65 X |
| 4,998,559 | 3/1991 | McAuliffe | 137/596.17 |

*Primary Examiner*—Gerald A. Michalsky
*Attorney, Agent, or Firm*—Lorusso & Loud

[57] ABSTRACT

A three-way solenoid valve consisting of a solenoid device portion 20 and a valve portion 40. The same solenoid device portion 20 is used whether the valve is normally open or normally closed. The solenoid device portion 20 comprises a plunger 23 driven by a solenoid coil 27, a sleeve 26 guiding the plunger, a yoke 32 fitted over the sleeve, a push rod 24 mounted to the plunger. The valve portion 40 comprises an inner base 46 having a valve seat, an outer base 42 having a second valve seat, and a ball 48 mounted between the valve seats. The inner base is mounted on the outer base. The front end of the push rod can bear against the ball. The outer base 42 bears against the yoke 32.

4 Claims, 6 Drawing Sheets

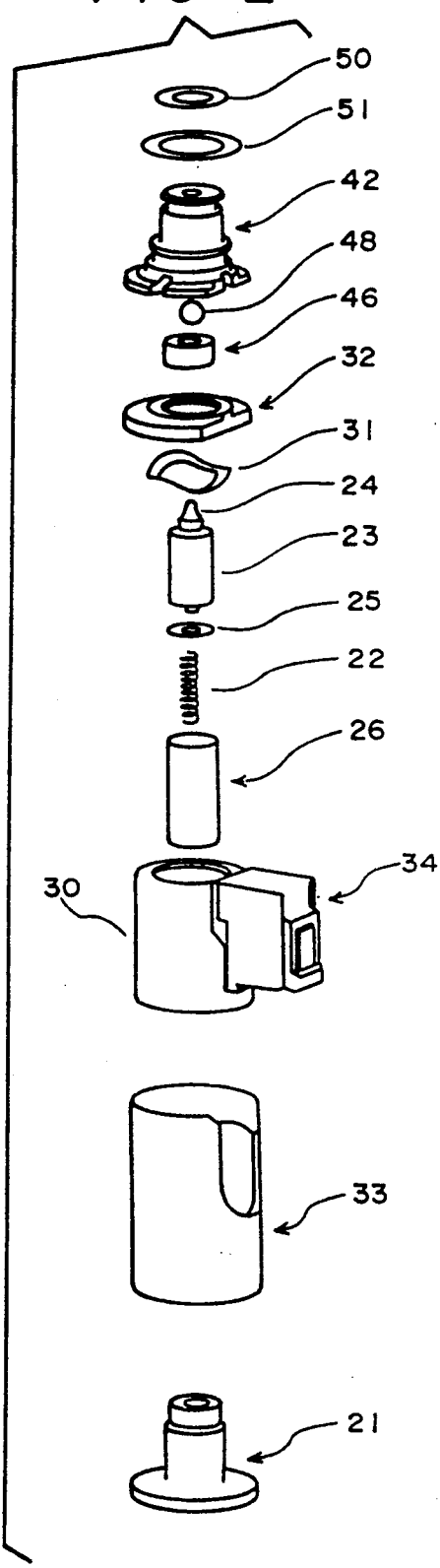
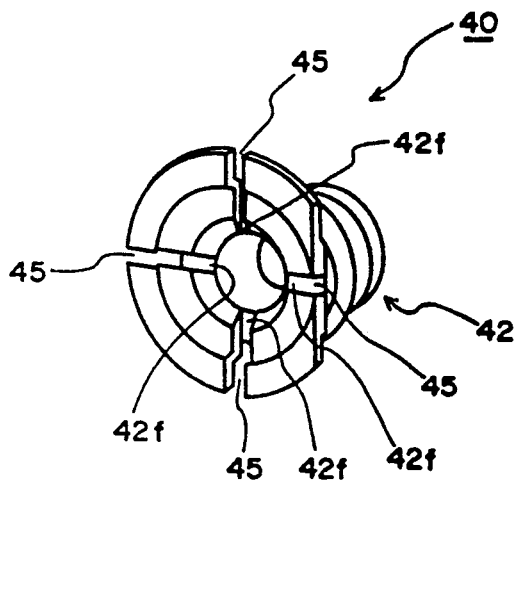

THREE-WAY SOLENOID VALVE AND METHOD OF FABRICATING SAME

FIELD OF THE INVENTION

The present invention relates to a three-way solenoid valve and, more particularly, to a three-way solenoid valve in which a ball is driven by a solenoid device that is actuated by an electrical signal to switch the fluid passage.

BACKGROUND OF THE INVENTION

One known three-way solenoid valve of this kind is shown in FIG. 8 and includes the outer case of a valve portion, a case 1, a rear plate 2, a plunger valve 4 having a plunger 4a, a core 3 for magnetically attracting the plunger 4a, a bobbin 5 made from an insulator, a solenoid coil 6 wound on the bobbin 5 for producing electromotive force, a ball 11, a first valve seat 12 having a seat surface 12a, an input port 13 formed in the case 1 along the axis of the seat 12, an output port 14 formed in the case 1, an exhaust port 15 formed in the case 1, and a second valve seat 16 disposed opposite to the first valve seat 12. The case 1 cooperates with the outer case to form an integrated magnetic circuit. The core 3 is coupled to the rear plate 2 with screws. The first valve seat 12 cooperates with the ball 11 to form a first valve body portion. The second valve seat 16 has a seat surface 16a which cooperates with the ball 11 to form a second valve body portion.

Another solenoid valve has been proposed as disclosed in Japanese Utility Model Laid-Open No. 184278/1988. This valve is shown in FIG. 9 and includes a core 3 having an exhaust port 15, a plunger valve 4 having a communication hole 4c, and a guide member 10 having a communication hole 10a. The exhaust port 15 is located in the uppermost position so that the movable portion of the solenoid valve may be kept immersed in fluid.

In each of the conventional solenoid valves shown in FIGS. 8 and 9, when the coil 6 is not energized, the valve is closed. When the coil 6 is energized, the valve is open. That is, these three-way solenoid valves are normally closed valves.

Therefore, when a normally open three-way solenoid valve is required, it is inevitably different in its entire structure from the normally closed solenoid valve.

In addition, each conventional three-way valve has a case which cooperates with the outer case of the valve portion to form an integrated magnetic circuit and, accordingly, it is cumbersome to assemble the valve. The solenoid device portion and the valve portion are combined in a unit.

SUMMARY OF THE INVENTION

It is an object of the invention to provide a three-way solenoid valve consisting of a solenoid unit which may be used irrespective of whether the valve is normally open or normally closed, i.e. which is interchangeable with both normally open and normally closed valves, whereby the valve unit can be easily fabricated irrespective of the type of the valve.

It is another object of the invention to provide a method of fabricating a three-way solenoid valve having features as described in the preceding paragraph.

It is a further object of the invention to provide a three-way solenoid valve which is simple in structure and can be easily and quickly assembled.

It is a yet other object of the invention to provide a method of fabricating the solenoid valve having features as described in the previous paragraph.

A three-way solenoid valve according to the invention has an input port, an output port, exhaust ports, and a solenoid device that switches the fluid flow in the valve, and comprises a plunger driven by a solenoid coil; a sleeve for guiding the plunger; a yoke fitted over the outside of the sleeve; a push rod rigidly fixed to the plunger; an inner base having a first valve seat; an outer base which has a second valve seat and on which the inner base is mounted, the outer base bearing against the yoke; and a ball mounted between the valve seats, the front end of the push rod being capable of bearing against the ball.

Another three-way solenoid valve according to the invention has an input port, an output port, exhaust ports, and a solenoid device that switches the fluid flow in the valve, and comprises a plunger driven by a solenoid coil; a sleeve for guiding the plunger; a yoke fitted over the outside of the sleeve; a push rod rigidly fixed to the plunger and having a tapered surface; an inner base having a first valve seat and a second valve seat that can bear against the tapered surface; an outer base which bears against the yoke and on which the inner base is mounted; and a ball capable of bearing against the first valve seat, the front end of the push rod being capable of bearing against the ball.

In fabricating the three-way solenoid valve, the inner base and the outer base are crimped against each other, whereby they are coupled together. Then, the base of the solenoid device is crimped against both yoke and outer base.

Other objects and features of the invention will appear in the course of the description thereof which follows.

BRIEF DESCRIPTION OF THE DRAWINGS

FIG. 2 is an exploded perspective view of the valve shown in FIGS. 1 (a) and (b);

FIG. 3 is a perspective view of the valve portion of the valve shown in FIGS. 1(a), (b), and 2, as viewed from the rear side of the valve portion;

DETAILED DESCRIPTION OF THE INVENTION

Figure 1A:
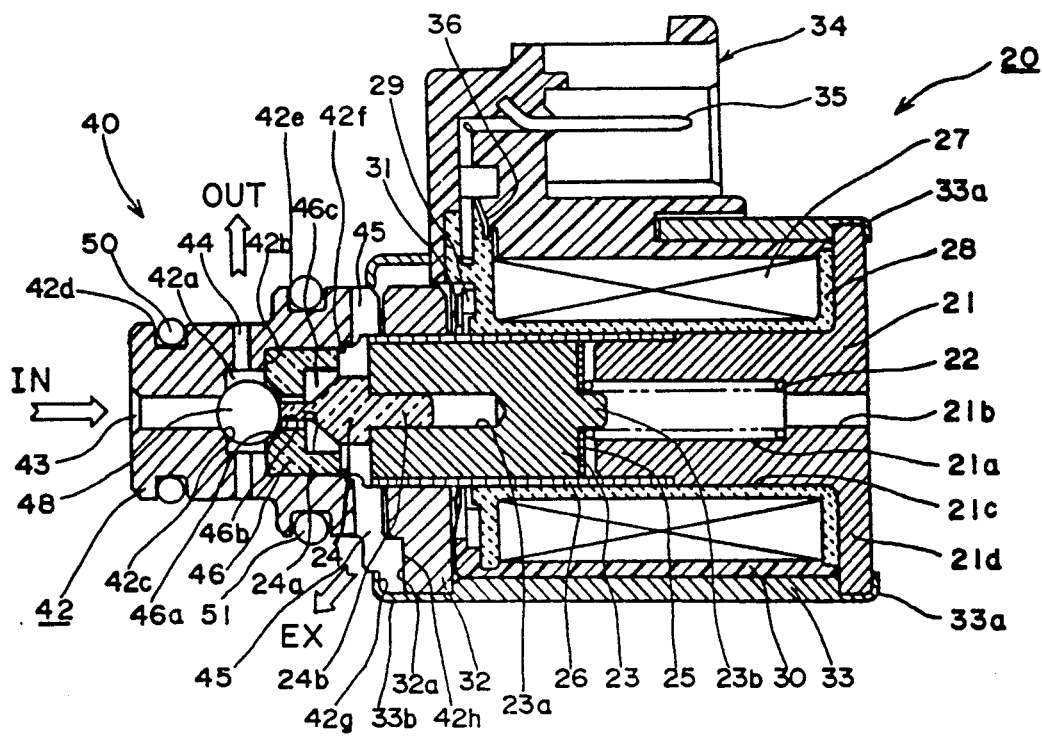
FIGS. 1 (a) and (b) are cross-sectional views of a normally closed three-way solenoid valve according to the invention.

Referring to FIGS. 1(a), (b), and 2, there is shown a normally closed, three-way solenoid valve according to the invention. This solenoid valve consists of a solenoid device portion 20 and a valve portion 40.

The solenoid device portion 20 comprises a core 21 of an electromagnet, a spring 22, a plunger 23 mounted axially aligned with the core 21, a coil 27, a push rod 24, a spacer 25 made from a nonmagnetic material, a conductive plunger sleeve 26 mounted at the front end of the outer circumference of the core 21 and the plunger 23, a cylindrical bobbin 28, a case 33, and a yoke 32.

A hole 21a receiving the spring 22 extends forwardly from the center of the core 21. The core 21 is also provided with a hole 21b communicating with the hole 21a. These holes 21a and 21b can absorb changes in the volume caused by movement of the plunger 23. A cylindrical portion 21c on which the coil 27 is mounted is formed concentrically the holes 21a, 21b. Also, a flange 21d forming a rear end portion is formed concentrically of the holes 21a, 21b. A hole 23a in which the push rod 24 is mounted with a press fit is formed in the front end of the plunger 23. A protrusion 23b on which the spring 22 bears is formed behind the plunger 23 that is formed independent of the push rod 24. The rod 24 has a protrusion 24a at its front end, the protrusion 24a bearing on a ball 48 (described later). Also, the rod 24 has a cylindrical protrusion 24b fitted in the hole 23a formed in the plunger 23. The spacer 25 is disposed on the rear end surface of the plunger 23 and bears against the front end of the spring 22. When the coil 27 is deenergized, the spacer 25 prevents the plunger 23 from being attracted to the core 21 by the residual magnetism. The coil 27 is mounted radially outward of the plunger sleeve 26 and the cylindrical portion 21c of the core 21 via the bobbin 28. The coil 27 forms a magnetic circuit in such a way that its magnetic path is formed by the core 21, the case 33, the yoke 32, the plunger sleeve 26, and the plunger 23. The case 33 on which a socket 34 is mounted is installed outside the magnetic circuit. The socket 34 includes a single-pole plug 35 to which a positive voltage is applied. A lead wire 36 is connected with the plug 35 and also with the coil 27. A grounding plate 29 connected to the ground terminal of the coil 27 is located ahead of the bobbin 28 and coupled to the bobbin via plastic piece 30. A wave washer 31 is in contact with the grounding plate 29. The yoke 32 is disposed ahead of the washer 31 and in resilient contact with the washer. The washer 31 prevents the coil 27 from rattling and permits the body of the coil 27 to be grounded. The yoke 32 is annular in shape and fitted over the front portion of the outer surface of the plunger sleeve 26. The yoke 32 has a notch 32a near its bottom. The outer base 42 fits in the notch 32a to form a step.

Referring also to FIG. 3, the valve portion 40 comprises an outer base 42, an inner base 46, and the above-described ball 48. The outer base 42 has an enlarged hole 42a with a step 42b, a valve seat 42c on which the ball 48 bears, and grooves 42d, 42e. O rings 50 and 51 acting as seals are installed in the grooves 42d and 42e, respectively. A notch 42g in which the case 33 is crimped is formed below the outer base 42. A protrusion 42h fitting in the yoke 32 is formed in the rear surface of the outer base 42. The outer base 42 is provided with an input port 43, an output port 44, and exhaust ports 45.

The manner in which this three-way solenoid valve is assembled is now described briefly. First, the solenoid device portion 20 is assembled. The coil 27 on the bobbin 28 is coupled to the socket 34 with the plug 35 via the molding material 30. The thus obtained subassembly is mounted in the case 33. The plunger 23 is mounted within the coil 27 along with the core 21, the plunger sleeve 26, and the spring 22. The thin-walled fringe of the case is crimped against the fringe of the flange 21d of the core 21 at the rear end 33a of the case 33. The yoke 32 is mounted at the front end of the plunger 23 via the wave washer 31.

Then, the valve portion 40 is assembled. After inserting the ball 48 in the enlarged hole 42a in the outer base 42, the inner base 46 is fitted into the hole 42a so as to bear against the step 42b. At this time, as shown in FIG. 3, the inner ends of the grooves forming the exhaust ports 45 formed in the rear surface of the outer base 42 are crimped at 42f to combine the inner base 46 and the outer base 42 into a unit.

In the valve portion 40 assembled in this way, the outer base 42 is provided with the four exhaust ports 45 spaced 90° from each other, as shown in FIG. 3. The inner ends 42f of the outer base are crimped. The push rod 24 is placed in position so that its front end faces a small hole 46b extending through the inner base 46. The outer base 42 is caused to abut against the yoke 32. In this manner, the thin-walled fringe 33b at the front end of the case 33 is crimped into a notch 42h formed in the outer base 42. Thus, the assembly of the three-way solenoid valve is completed.

The operation of this three-way solenoid valve is now described. When electrical current is not supplied to the plug 35 and the coil 27 is not energized, the plunger 23 is pushed forward by the action of the spring 22 to cause the push rod 24 to push the ball 48 forward as shown in FIG. 1(a). Therefore, the solenoid valve is closed. In particular, the ball 48 bears on the second valve seat 42c of the outer base 42 but is not in contact with the first valve seat 46a of the base 46. The fluid passage extending from the input port 43 is closed off, whereby the supply of fluid is stopped. The fluid filling the output port 44 is passed through the exhaust passage and the exhaust ports 45. As a result, the fluid is forced out of the solenoid valve.

Figure 1B:
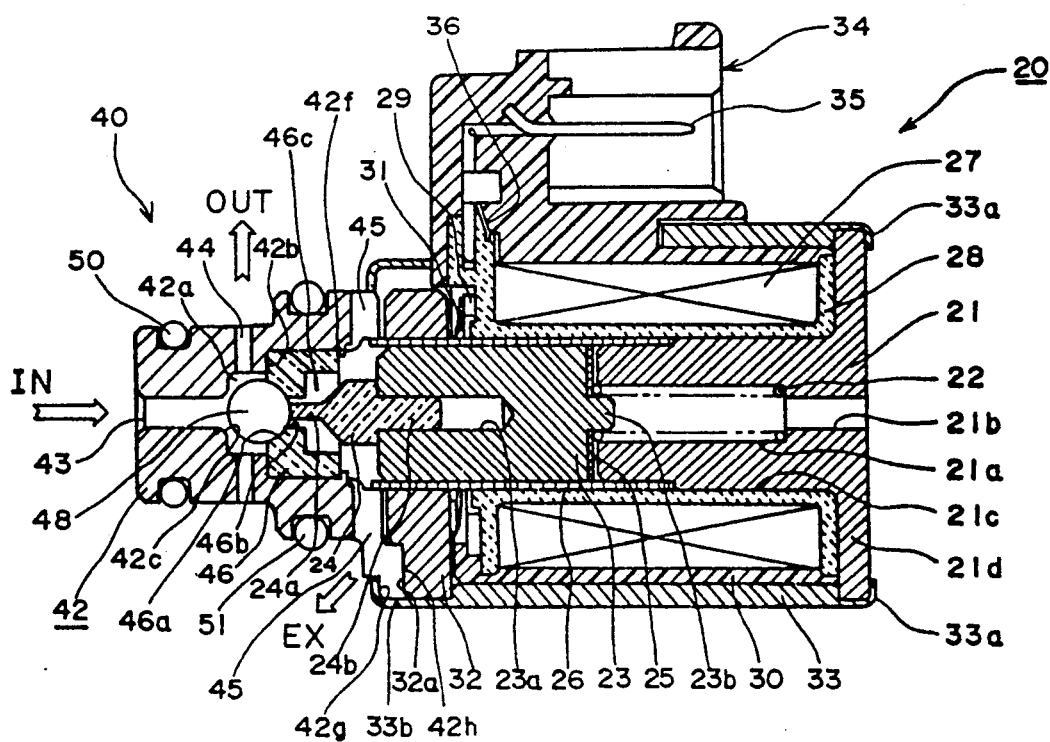

When electrical current is supplied to the plug 35 to energize the coil 27, the plunger 23 is attracted rearward against the force of the spring 22 as shown in FIG. 1(b). The push rod 24 is also moved rearward. Fluid is supplied from the input port 43 to move the ball 48 away from the second valve seat 42c of the outer base 42 and against the first valve seat 46a of the inner base 46. Therefore, fluid entering from the input port 43 flows to the output port 44. The passage extending to the exhaust ports 45 is closed off.

Figure 4A:
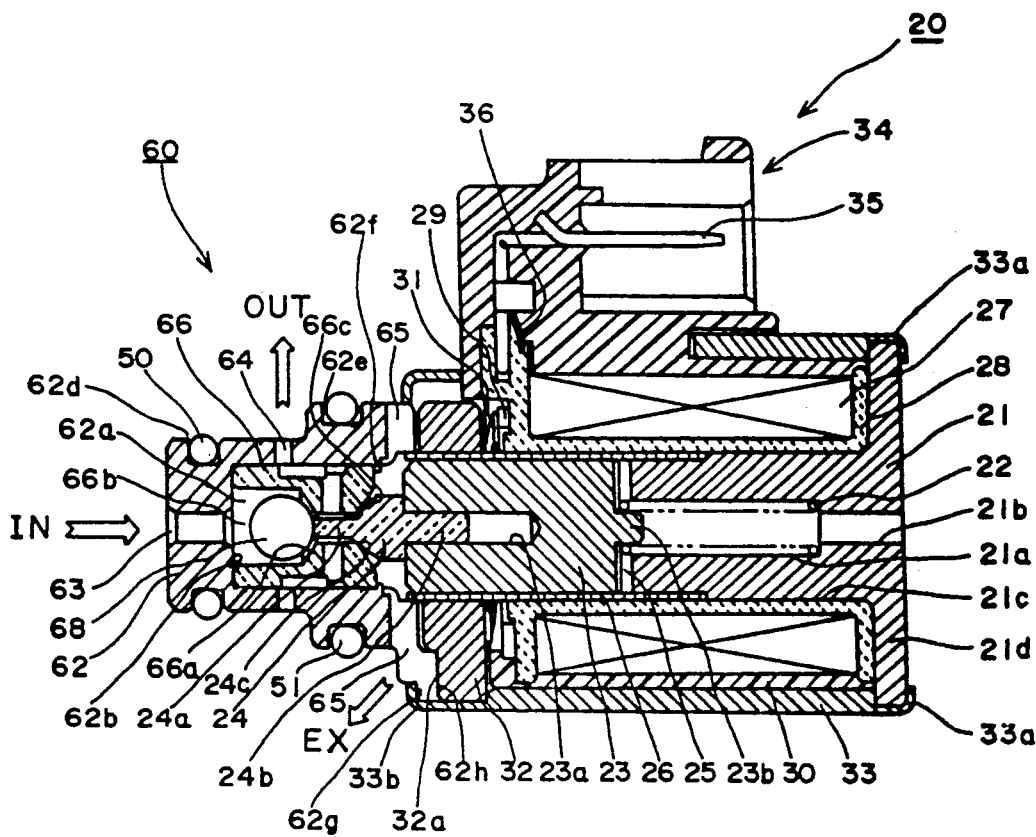
FIGS. 4 (a) and (b) are cross-sectional views of a normally open three-way solenoid valve according to the invention.

Referring next to FIGS. 4(a), (b), 5, and 6, there is shown a normally open three-way solenoid valve according to the invention. The solenoid device portion 20 of this valve is similar to that of the normally closed solenoid valve already described except that the push rod 24 of the solenoid device portion 20 has a tapering surface 24c seating against the rear surface of the inner base 46. Consequently, the solenoid device portion 20 acts like a needle valve.

The valve portion of this normally closed solenoid valve is indicated by numeral 60 and comprises an outer base 62, an inner base 66, and a ball 68. The outer base 62 is provided with an enlarged hole 62a having an annular shoulder 62b. The inner base 66 accommodating the ball 68 is mounted in the enlarged hole 62a. A notch 62g in which the case 33 is crimped is formed in the outer base 62 near its lower end. A protrusion 62h fitted over the yoke 32 is formed on the rear surface of the outer base 62. The inner base 66 is formed with a recess 66b near its front end, the recess 66b receiving the ball 68. The inner base 66 has a valve seat 66a at its bottom. A hole extends through the inner base 66 and is in communication with an output port 64 and with exhaust ports 65. A second valve seat 66c is formed in the rear surface of the inner base 66. The tapering surface 24c of the push rod 24 can bear against the second valve seat. Thus, the valve portion functions like a needle valve.

The outer base 62 is provided with grooves 62d and 62e in which O rings 50 and 51 serving as seals are respectively inserted. Further, the outer base 62 is formed with an input port 63, an output port 64, and exhaust ports 65.

In the hole connecting the recess 66b with the exhaust ports 65, the front end 24a of the push rod 24 can move back and forth to move the ball 68.

The manner in which this three-way solenoid valve is assembled is next described briefly. The solenoid device portion 20 is assembled in the same way as in the previous example. In order to initiate the assembly of the valve portion 60, the ball 68 is installed in the enlarged hole 62a in the outer base 62. Then, the inner base 66 is fitted into the enlarged hole 62a so as to bear against the annular shoulder 62b. The inner ends 62f of the grooves forming the exhaust ports 65 formed in the rear surface of the outer base 62 are crimped to combine the inner base 66 and the outer base 62 into a unit.

Figure 6:
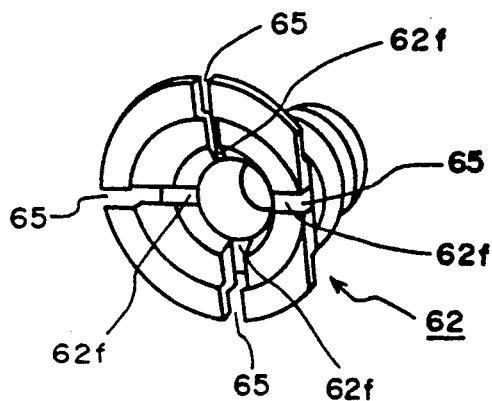
FIG. 6 is a perspective view of the valve portion of the valve shown in FIGS. 4 (a), (b), and 5.

In the valve portion 60 assembled in this way, the outer base 62 is provided with the four equally spaced exhaust ports 65 as shown in FIG. 6. The inner ends 62f are crimped. The front end 24a of the push rod 24 is placed in position so as to face the small hole extending through the inner base 66. The outer base 62 is made to bear against the yoke 32. Under this condition, the thin-walled front end portions 33b of the case 33 are crimped into the notches 62g in the outer base 62. Thus, the assembly of the three-way solenoid valve is completed.

The operation of this three-way solenoid valve is now described. When no electrical current is supplied to the plug 35 and the coil 27 is not energized, the plunger 23 is pushed forward by the force of the spring 22, as shown in FIG. 4 (a). The ball 68 is urged forward by the push rod 24. As a result, the solenoid valve is opened. That is, the ball 68 is moved away from the first valve seat 66a of the inner base 66. Fluid entering from the input port 63 is directed toward the output port 64. The tapering surface 24c of the push rod 24 bears against the second valve seat 66c on the rear surface of the inner base 66. Since the tapering surface acts like a needle valve, the passage extending to the exhaust ports 65 is closed off.

When electrical current is supplied to the plug 35 and the coil 27 is energized, the plunger 23 is attracted rearward against the force of the spring 22 as shown in FIG. 4 (b), thus moving the push rod 24 rearward. Fluid supplied from the input port 63 urges the ball 68 against the first valve seat 66a of the inner base 66, thereby stopping the supply of the fluid from the input port 63. At the same time, the tapering surface 24c of the push rod 24 is moved away from the second valve seat 66c on the rear surface of the inner base 66. The fluid filling the output port 64 is discharged from the solenoid valve via the exhaust passage and the exhaust ports 65.

Figure 7:
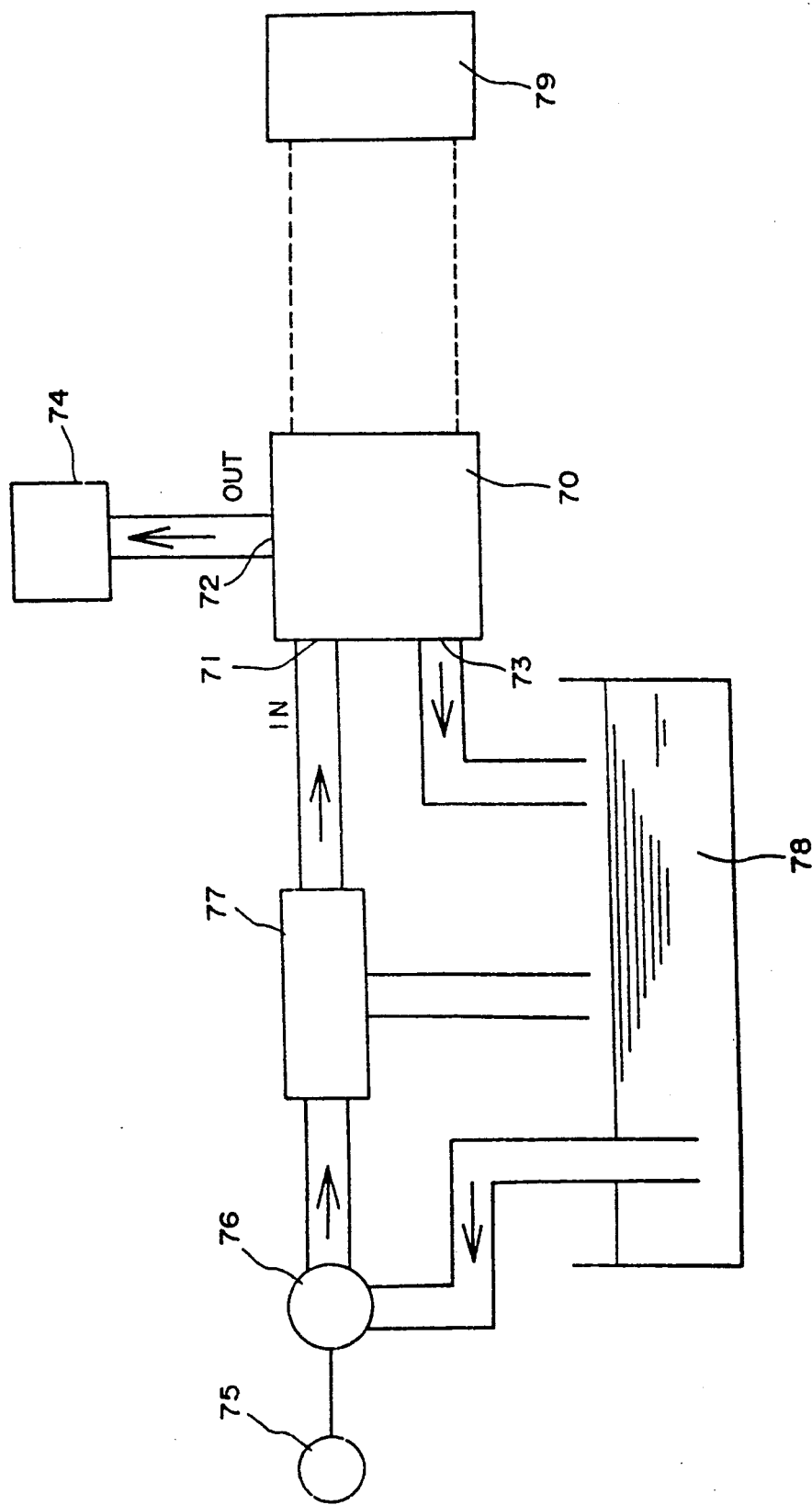
FIG. 7 is a block diagram of a hydraulic circuit including a three-way solenoid valve according to the invention.
Figure 8:
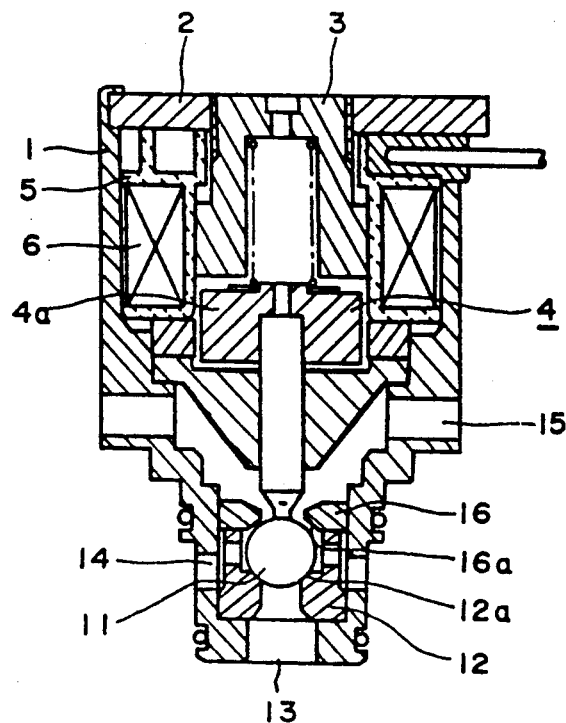
FIG. 8 is a cross-sectional view of a conventional three-way solenoid valve.
Figure 9:
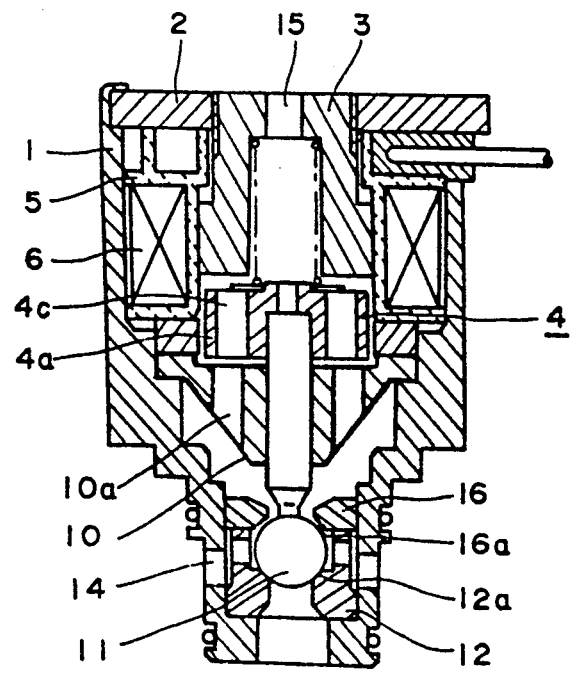
FIG. 9 is a cross-sectional view of another conventional three-way solenoid valve.

Referring to FIG. 7, there is shown a hydraulic circuit including a three-way solenoid valve according to the invention. The valve is indicated by numeral 70. A pump 76 is driven by a motor 75 to supply fluid from a fluid reservoir 78 to a regulator 77. The fluid pressure regulated here is sent to the input port 71 of the valve 70. The output port 72 of the valve 70 is connected with a damping valve 74. Fluid expelled from the exhaust port 73 of the valve 70 is directed into the reservoir 78. The duty cycle of the valve 70 is controlled by electrical current supplied from a duty output driver circuit 79.

In the operation of the hydraulic circuit of this construction, when no electrical current is supplied to the coil 27, the input port 71 and the output port 72 of the three-way solenoid valve 70 are closed as shown in FIG. 1(a). The circuit port 72 is in communication with a drain 73. When electrical current is supplied to the coil 27, the output port 72 is connected with the input port 71 as shown in FIG. 1(b). The output port 72 and the drain 73 are closed.

Figure 4B:
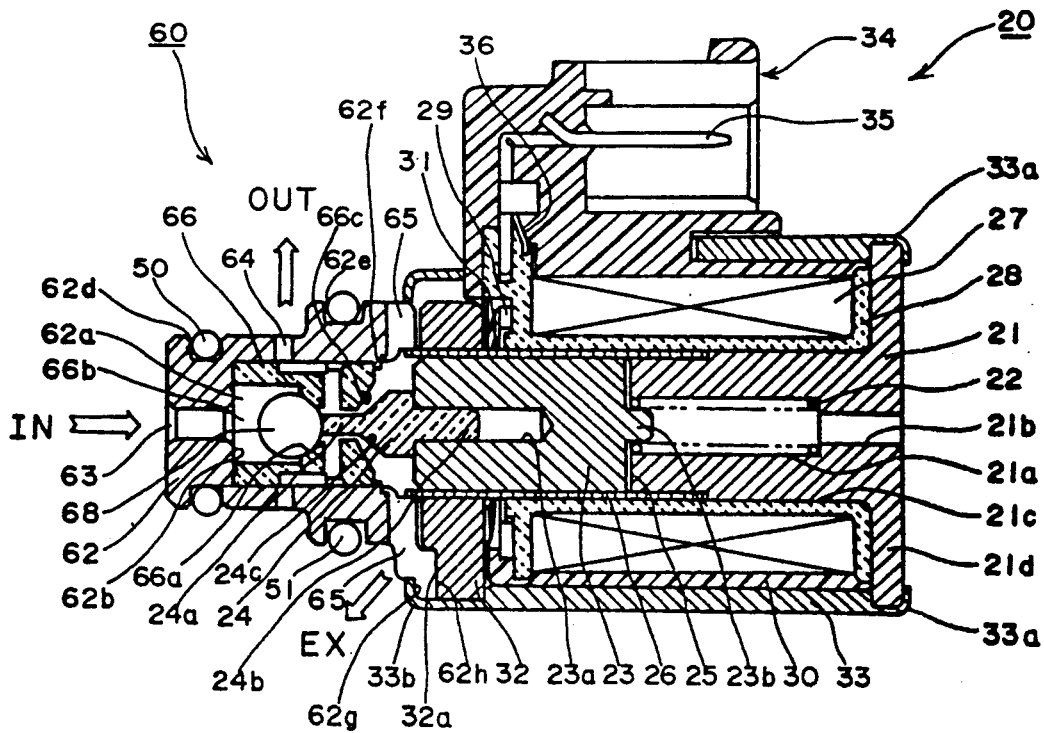
Figure 5:
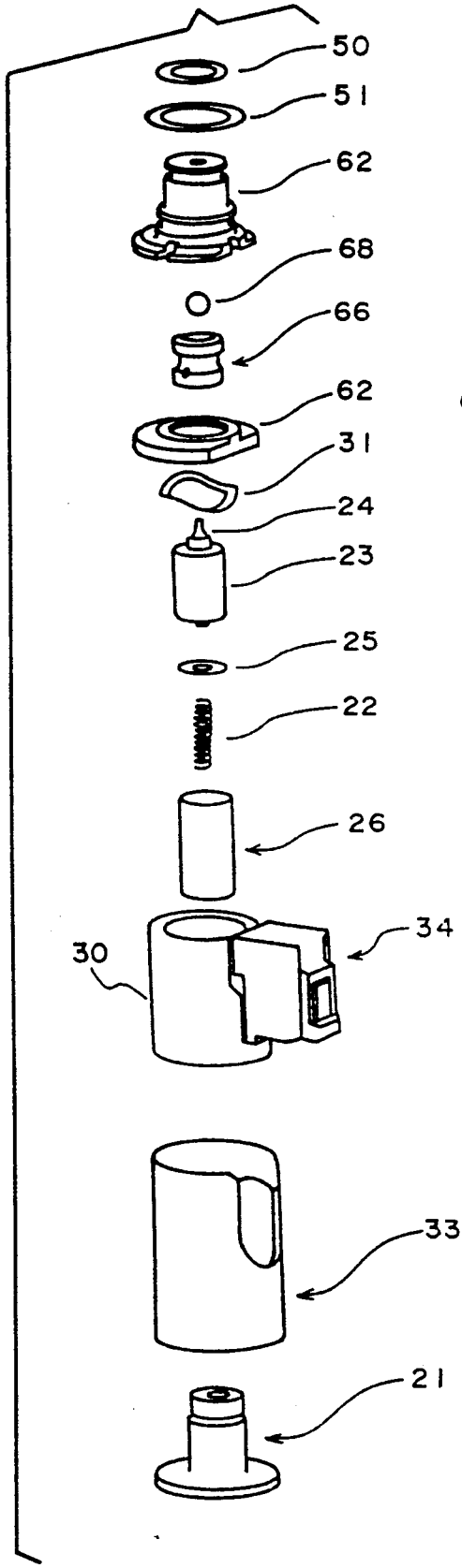
FIG. 5 is an exploded perspective view of the valve shown in FIGS. 4 (a) and (b)

When the coil 27 is not energized, the input port 71 is connected with the output port 72 as shown in FIG. 4(a). The output port 72 and the drain 73 are closed. When the coil 27 is energized, the input port 71 and the output port 72 are closed, as shown in FIG. 4(b). The output port 72 is connected with the drain 73.

In the above examples, the outer base, the inner base, the ball, and the push rod are made from nonmagnetic materials to prevent adhesion of foreign matter.

The novel three-way solenoid valves yield the following advantages.

(1) Either the normally closed valve or the normally open valve can be fabricated simply by changing the outer base (42 or 62) and the inner base (46 or 66). The positions of the oil passages in the valve body, i.e., the positions of the input port (43 or 63), the output port (44 or 64), and the exhaust ports (45 or 65) are common to both kinds of valves. Either kind of valve can be easily mounted in a hydraulic circuit.

(2) A step is formed on the yoke (32). The outer base (42 or 62) is mounted to the yoke (32) whose center is placed in position by the sleeve (26). Therefore, the structure can be made compact. Because the step is formed at a corner, the increase in the magnetic resistance due to the step is negligible. The step enables the outer base (42 or 62) to be placed in position accurately.

(3) The inner base (46 or 66) and the outer base (42 or 62) are crimped against each other to obtain a semi-finished item and so they can be easily combined into units. Also, the whole valve can be quickly and precisely assembled.

(4) As the centers of the core (21), the plunger (23), and the outer base (42 or 62) are determined by the sleeve (26), the centers can be placed in position with improved accuracy. This assures that the ball (68) is properly aligned with the push rod (24). When the normally open three-way solenoid valve is closed, leakage of fluid is prevented. Thus, the valve acts like an excellent needle valve.

What is claimed is:

1. A three-way solenoid valve for switching fluid flow, said valve comprising:
   an annular solenoid coil defining a central axial opening;
   means for supplying current to the coil to energize the coil;
   a core provided in the central axial opening for supporting the coil;

a sleeve extending at least part way into the central axial opening and mounted around the core;

a yoke mounted around the sleeve;

a plunger provided slidably within the sleeve for reciprocating axial motion responsive to the energization of the coil;

a push rod of non-magnetic material fixed to one end of the plunger;

a spring provided between the plunger and the core; and a valve body having (a) an outer portion mounted around the sleeve and on the yoke, said outer portion having a center recess, an outlet in fluid communication with the recess, an inlet in fluid communication with the recess and an exhaust port in fluid communication with the recess;

(b) an inner portion nested within the recess of the outer portion, said inner portion having a port coaxial with the plunger and providing fluid communication between the inlet and the exhaust port, and first and second valve seats formed on opposing sides of the inner portion around the port;

(c) a ball mounted within the recess between the inner and outer portions for seating in the first valve seat responsive to movement of the push rod against the force of the spring; and (d) a fluid passage in the inner portion intermediate the first and second valve seats and providing fluid communication between the port and the outlet;

said push rod having a tapered portion for seating in the second valve seat by the force of the spring.

2. A three-way solenoid valve in accordance with claim 1, wherein said push rod extends through the port to define an annular space surrounding the push rod, and said exhaust port is formed in the outer portion in fluid communication, through the annular space, with the inlet and the outlet.

3. A three-way solenoid valve in accordance with claim 1, wherein said outer portion is crimped against the inner portion, whereby said outer and inner portions are coupled together.

4. A three-way solenoid valve in accordance with claim 1, further comprising:

a case for mounting the solenoid coil, the core, the sleeve, the plunger and the push rod, said case being crimped against both the yoke and the outer portion; whereby said case, said yoke and said outer portion are coupled together.

* * * * *